(12) United States Patent
Lin

(10) Patent No.: US 11,669,223 B2
(45) Date of Patent: Jun. 6, 2023

(54) METHOD FOR SEARCHING FOR IMAGE AND TERMINAL DEVICE

(71) Applicant: VIVO MOBILE COMMUNICATION CO., LTD., Guangdong (CN)

(72) Inventor: Yuantao Lin, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 29 days.

(21) Appl. No.: 17/384,303

(22) Filed: Jul. 23, 2021

(65) Prior Publication Data

US 2021/0349584 A1 Nov. 11, 2021

Related U.S. Application Data

(63) Continuation of application No. PCT/CN2020/073810, filed on Jan. 22, 2020.

(30) Foreign Application Priority Data

Jan. 29, 2019 (CN) .......................... 201910086046.2

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 3/0488* (2013.01); *G06F 3/04845* (2013.01);
(Continued)

(58) Field of Classification Search
CPC .... G06F 3/0488; G06F 3/04845; G06F 16/54; G06F 16/53; G06F 3/0482
See application file for complete search history.

(56) References Cited

U.S. PATENT DOCUMENTS 9,715,482 B1 * 7/2017 Bjorkegren ......... G06F 3/04855
10,088,994 B2 10/2018 Hirohata et al.
(Continued)

FOREIGN PATENT DOCUMENTS

AU 2015258314 A1 * 12/2015 ......... G06F 16/9038
AU 2015258314 B2 * 12/2016 ......... G06F 16/9038
(Continued)

OTHER PUBLICATIONS

International Search Report and Written Opinion of the International Searching Authority issued in PCT/CN2020/073810, dated Apr. 22, 2020; Translation provided by Bohui Intellectual Property.
(Continued)

*Primary Examiner* — Rashawn N Tillery
(74) *Attorney, Agent, or Firm* — Harness, Dickey & Pierce, P.L.C.

(57) ABSTRACT

An image search method includes: receiving a first input that is performed by a user on a first identifier in a preset control displayed at a target position of an image display interface, wherein the image display interface includes at least one image; in response to the first input, displaying at least one thumbnail associated with the first identifier; receiving a second input that is performed on a first thumbnail of the at least one thumbnail; and in response to the second input, marking a first display position of a first image corresponding to the first thumbnail on the image display interface.

20 Claims, 9 Drawing Sheets

(51) Int. Cl.
  *G06F 16/53* (2019.01)
  *G06F 16/54* (2019.01)
  *G06F 3/04845* (2022.01)
  *G06F 3/04855* (2022.01)
  *G06F 3/0488* (2022.01)
(52) U.S. Cl.
  CPC ......... *G06F 3/04855* (2013.01); *G06F 16/53* (2019.01); *G06F 16/54* (2019.01)

(56) References Cited

U.S. PATENT DOCUMENTS

| | | | |
|---|---|---|---|
| 2006/0184901 | A1 | 8/2006 | Dietz |
| 2011/0138282 | A1* | 6/2011 | Lai ........................ G06F 40/169 715/716 |
| 2014/0214591 | A1* | 7/2014 | Kotinaga ........... G06Q 30/0631 705/26.7 |
| 2015/0177933 | A1* | 6/2015 | Cueto ................... G06F 3/0485 715/776 |
| 2016/0125062 | A1 | 5/2016 | Karlsson et al. |
| 2016/0179766 | A1 | 6/2016 | Samsung |
| 2017/0134605 | A1* | 5/2017 | Ju ..................... H04N 5/232935 |
| 2020/0327158 | A1* | 10/2020 | Zhang ................ G06F 3/04842 |

FOREIGN PATENT DOCUMENTS

| | | | | |
|---|---|---|---|---|
| CN | 103310005 | A | | 9/2013 |
| CN | 103412762 | A | | 11/2013 |
| CN | 103995889 | A | | 8/2014 |
| CN | 104049844 | A | * | 9/2014 |
| CN | 105025190 | A | | 11/2015 |
| CN | 106407383 | A | * | 2/2017 |
| CN | 107682540 | A | | 2/2018 |
| CN | 107783709 | A | * | 3/2018 ......... G06F 3/04842 |
| CN | 107797738 | A | | 3/2018 |
| CN | 108089788 | A | | 5/2018 |
| CN | 108121486 | A | | 6/2018 |
| CN | 108153900 | A | | 6/2018 |
| CN | 108769374 | A | | 11/2018 |
| CN | 109145130 | A | | 1/2019 |
| CN | 109829070 | A | | 5/2019 |
| KR | 20090093125 | A | | 9/2009 |

OTHER PUBLICATIONS

Notification to Grant Patent Right for Invention For Chinese Application 201910086046.2, dated Nov. 6, 2020. Translation provided by Bohui Intellectual Property.

First Office Action regarding Chinese Patent Application No. 201910086046.2, dated Jul. 3, 2020. Translation provided by Bohui Intellectual Property.

Supplementary European Search Report regarding Application No. 20748042.7-1222/3920047; PCT/CN2020/073810, dated Feb. 28, 2022.

* cited by examiner

METHOD FOR SEARCHING FOR IMAGE AND TERMINAL DEVICE

CROSS-REFERENCE TO RELATED APPLICATIONS

This application is a Bypass Continuation Application of PCT/CN2020/073810 filed on Jan. 22. 2020, which claims priority to Chinese Patent Application No. 201910086046.2 filed on Jan. 29, 2019, which are incorporated herein by reference in their entirety.

TECHNICAL FIELD

The present disclosure relates to the field of communication technologies, and in particular, to an image search method and a terminal device.

BACKGROUND

When multiple images are selected from an image list, if a user needs to return to positions of previously selected one or more images in a subsequent browsing process, the user usually slides a page to find positions of the previous images one by one. This wastes a lot of time.

To save time of the user, some improvements are proposed: a thumbnail of a selected image is displayed on a side of an image list interface, and the thumbnail is clicked to jump to a corresponding position. However, this operation occupies a part of space. In addition, in the foregoing two methods, the user cannot quickly return to a previously browsed position.

SUMMARY

According to a first aspect, an embodiment of the present disclosure provides an image search method, including:
receiving a first input that is performed by a user on a first identifier in a preset control displayed at a target position of an image display interface, where the image display interface includes at least one image;
in response to the first input, displaying at least one thumbnail associated with the first identifier;
receiving a second input that is performed on a first thumbnail of the at least one thumbnail; and
in response to the second input, marking a first display position of a first image corresponding to the first thumbnail on the image display interface.

According to a second aspect, an embodiment of the present disclosure provides a terminal device, including:
a first receiving module configured to receive a first input that is performed by a user on a first identifier in a preset control displayed at a target position of an image display interface, where the image display interface includes at least one image;
a first display module, configured to display at least one thumbnail associated with the first identifier in response to the first input;
a second receiving module, configured to receive a second input that is performed on a first thumbnail of the at least one thumbnail; and
a first marking module, configured to mark a first display position of a first image corresponding to the first thumbnail on the image display interface in response to the second input.

According to a third aspect, an embodiment of the present disclosure further provides a terminal device. The terminal device includes a processor, a memory, and a computer program stored in the memory and executable on the processor. When the computer program is executed by the processor, the steps of the foregoing image search method are implemented.

According to a fourth aspect, an embodiment of the present disclosure provides a non-transitory computer-readable storage medium. The non-transitory computer-readable storage medium stores a computer program, and when the computer program is executed by a processor, the steps of the foregoing image search method are implemented.

DETAILED DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

The term "and/or" in this specification describes only an association relationship for describing associated objects and represents that three relationships may exist. For example, A and/or B may represent the following three cases: only A exists, both A and B exist, and only B exists.

Figure 1:
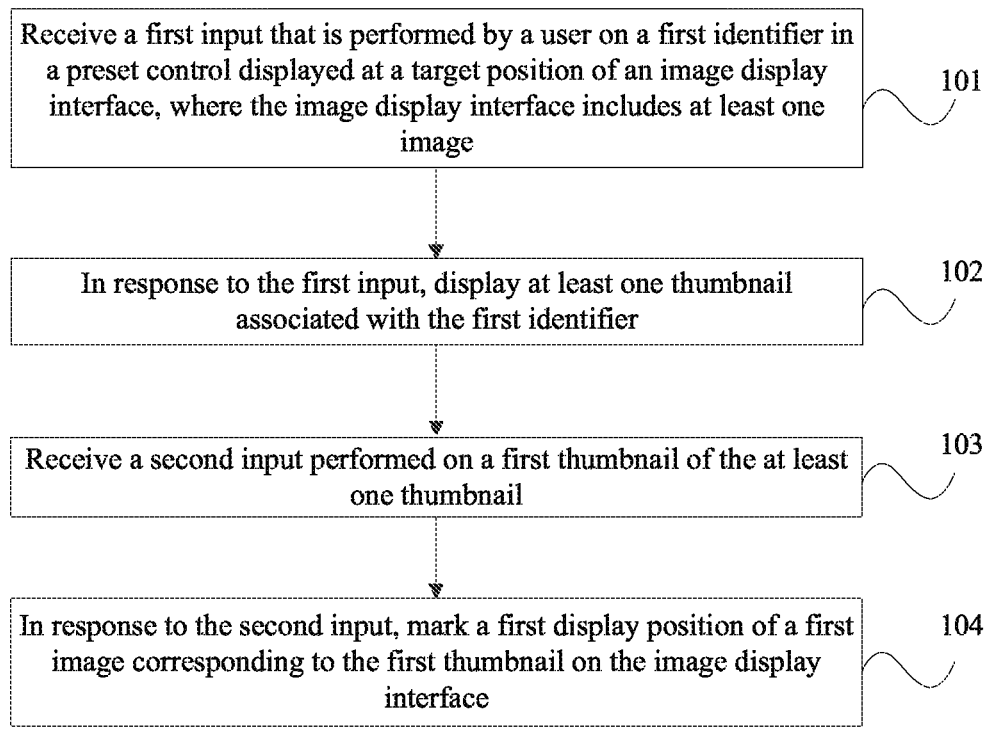
FIG. 1 is a schematic diagram of an image search method according to an embodiment of the present disclosure.

An embodiment of the present disclosure provides an image search method. As shown in FIG. 1, the image search method includes:

Step 101: Receive a first input that is performed by a user on a first identifier in a preset control displayed at a target position of an image display interface, where the image display interface includes at least one image.

Figure 2:
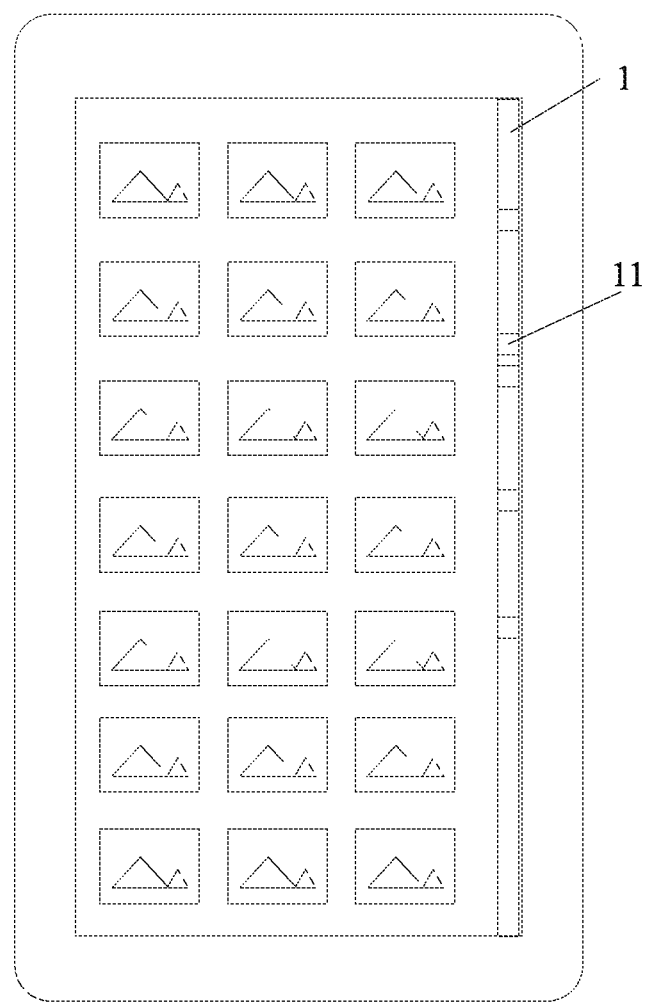
FIG. 2 is a schematic diagram of displaying a preset control on an image display interface according to an embodiment of the present disclosure.

In the image search method provided in the embodiments of the present disclosure, the preset control can be displayed at the target position of the image display interface including at least one image, where the preset control may include at least one identifier. The target position can be located on the left or right edge of the image display interface, or can be disposed at other suitable positions according to the requirement of the user. There is no further limitation herein. The width of the preset control is set to be touched by the finger of the user, and at least one identifier can be included in the width direction. Herein, a form of the preset control can be a navigation bar, as shown in FIG. 2. The preset control (navigation bar) 1 is displayed on the right edge of the image display interface, the first identifier 11 is displayed in the preset control 1, and the image display interface displays images in a form of a list of n rows and m columns. There can be multiple identifiers included in the preset control, which can be specifically determined according to a selection operation performed by the user on images.

After the preset control is displayed, if the user wants to view a selected image, the user can perform the first input on the first identifier in the preset control, and the terminal device can perform step 102 according to the first input of the user.

Step 102: In response to the first input, display at least one thumbnail associated with the first identifier.

After the terminal device receives the first input that is performed by the user on the first identifier, in response to the first input, at least one thumbnail associated with the first identifier is displayed on the image display interface. The at least one thumbnail can be displayed in a floating window. Each identifier in the preset control can correspond to a floating window, and each floating window can display at least one thumbnail corresponding to the identifier.

The floating window can be displayed with preset transparency, and correspondingly, the thumbnail in the floating window can also be displayed with the preset transparency. In this case, display of the floating window does not cover the image on the image display interface, and further can ensure that the user can view the thumbnail in the floating window.

Figure 3:
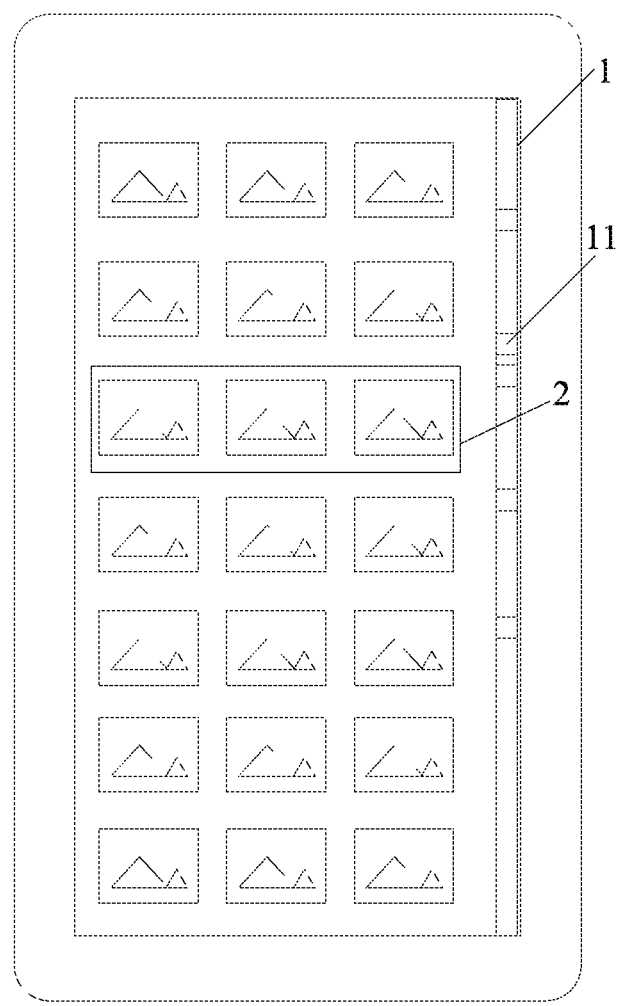
FIG. 3 is a schematic diagram of displaying a thumbnail on an image display interface according to an embodiment of the present disclosure.

An implementation of displaying the at least one thumbnail associated with the first identifier on the image display interface can be shown in FIG. 3. In this case, the thumbnail and the floating window including the thumbnail are not displayed with the preset transparency. When the user wants to view a selected image, the user touches the first identifier 11 in the preset control 1 on the side of the screen, or slides to the first identifier 11 in the preset control 1. In this case, at least one thumbnail associated with the first identifier 11 is displayed in the floating window 2. The floating window 2 is displayed on the image display interface and covers an initially displayed image on the image display interface. If the user slides away from the first identifier 11 in the preset control 1, display of the floating window 2 and at least one thumbnail associated with the first identifier 11 is canceled.

Step 103: Receive a second input that is performed on a first thumbnail of the at least one thumbnail.

After the at least one thumbnail associated with the first identifier is displayed, it can be detected whether the second input that is performed by the user on the first thumbnail of the at least one thumbnail is received. The second input herein can be an input operation that satisfies a preset pressure condition and/or that satisfies a preset duration condition. For example, when detecting an operation that a user leaves the display screen after pressing the first thumbnail for a certain period of time, it can be determined that the second input is received.

Step 104: In response to the second input, mark a first display position of a first image corresponding to the first thumbnail on the image display interface.

After the second input is received, in response to the second input, the first image corresponding to the first thumbnail can be determined on the image display interface, and the first display position of the first image is marked, so that the first image is displayed in a form different from those of other images, and it is convenient for the user to view the first image.

It should be noted that after the terminal device displays at least one thumbnail associated with the first identifier, it further can be detected whether the terminal device meets a preset condition, for example, whether the touch pressure of the image display interface is less than or equal to the preset pressure value. Optionally, the touch pressure on the image display interface can be zero, that is, the finger of the user leaves the image display interface at this time. When it is determined that the touch pressure meets the preset condition (for example, the finger of the user stops touching and leaves the screen), the first display position can be determined, so that a current view of the image display interface is positioned to the first image of the first display position. The first display position herein can be a position corresponding to the image of the first thumbnail in the floating window, and certainly is not limited to this and further can be other specific positions, which is not elaborated herein. In this manner, the current view of the image display interface can automatically jump to the first display position. The first display position is marked so that it is convenient for users to view the corresponding first image.

In the embodiments of the present disclosure, a first input that is performed by a user on a first identifier in a preset control displayed at a target position of an image display interface is received; in response to the first input, at least one thumbnail associated with the first identifier is displayed; a second input that is performed on a first thumbnail of the at least one thumbnail is received; and in response to the second input, a first display position of a first image corresponding to the first thumbnail is marked on the image display interface. The preset control and the identifier are disposed, so that a distribution position of a selected image can be displayed, and a user quickly slides to find the selected image. At the same time, the image can be displayed according to an operation performed by a user on the identifier, to quickly view the image. The thumbnail is hidden when the thumbnail is not needed. Therefore, this does not occupy display space, and ensures reasonable use of space of the terminal device.

In the embodiments of the present disclosure, before the receiving a first input that is performed by a user on a first identifier in a preset control displayed at a target position of an image display interface, the method further includes:

receiving a selection input that is performed on N images on the image display interface by a user, where the N images fall within a same display range; generating, in response to the selection input, a first identifier associated with the N images; determining a second display position of the first identifier based on the N images; and displaying the first identifier at the second display position of the preset control; where N is a positive integer.

Before the image display interface displays at least one image and receives the first input that is performed by the user on the first identifier in the preset control, the image display interface further can receive the selection input that is performed by the user on the N images in the image display interface, where N is a positive integer greater than or equal to 1. The N images can fall within the same display range, the same display range herein can be the same row, the same column, or the same area, and the area herein can include consecutive rows, consecutive columns, or several rows arranged at intervals or several columns arranged at intervals, Certainly, the same display range further can be other cases, which are not listed one by one herein.

After the selection input that is performed by the user on the N images is received, in response to the selection input that is performed by the user, the first identifier associated with the N images can be generated in the preset control, where the first identifier herein can be an identifier of the terminal device. During display in the preset control, the first identifier is displayed by using a default mark. The first identifier further can be an identifier that is generated by the terminal device according to the user's setting operation and that conforms to the user's usage habit, or can be an identifier combined according to type information of the N images. After the first identifier is generated, the second display position corresponding to the first identifier needs to be determined in the preset control, and then the generated first identifier is displayed at the second display position.

The above is a solution for generating the identifier for the N images located in the same display range. The N images are determined based on the user's selection input, and the first identifier associated with the N images and displayed in the preset control is generated. When the user needs to view the selected N images, the user can directly operate the first identifier to display the corresponding thumbnail, so that the user can quickly slide to find the selected image. At the same time, the image can be displayed to quickly view the image. When the user does not need the thumbnail, the user can hide the thumbnail, which does not occupy display space and ensures reasonable use of space of the terminal device.

In the embodiments of the present disclosure, the generating the first identifier associated with the N images includes:
obtaining an image type of each image of the N images; and generating, according to the image type of each image of the N images, the first identifier associated with the N images.

During generation of the first identifier associated with the N images, the image type corresponding to each image can be first obtained, and the first identifier can be generated based on the image type of each image. For example, the N images selected by the user include a landscape type and a character type. During generation of the first identifier, the corresponding first identifier can be generated according to the landscape type and the character type, so that the user can know the type information of the associated image based on the first identifier, and thus can ensure that the user can quickly find the image.

The above is a process of generating the image identifier according to the image type. The first identifier is determined based on the image type, so that the user can know the type of the associated image according to the first identifier. Therefore, it is convenient for the user to identify different types of images, and the images can be quickly found.

The generating, according to the image type of each image of the N images, the first identifier associated with the N images includes: generating, according to the image type of each image of the N images, an identifier corresponding to each image type; and obtaining characteristic information of each identifier, and re-organizing the characteristic information to generate the first identifier.

During generation of the first identifier, after the image type of each image of the N images is obtained, the corresponding identifier is generated for each image type, and then characteristic information of each generated identifier that is different from that of other identifiers is extracted. The information is reorganized based on the obtained characteristic information of each identifier, to generate the first identifier including the identifier characteristic corresponding to each image type. Before generating the corresponding identifier for each image type, a corresponding color can be determined for an image type on the setting interface, or a corresponding shape can be determined for an image type, or a color can be determined for one image type and a shape is determined for another image type. Optionally, after the user selects some images or when the user selects the N images again next time, the color and/or shape corresponding to the image type is changed. The above setting can facilitate the user to identify different types of images.

For example, the N images selected by the user include a landscape type and a character type. During generation of the first identifier, a landscape-type identifier can be generated according to the landscape type, and a character-type identifier is generated according to the character type. Then, the first characteristic information corresponding to the landscape-type identifier and the second characteristic information corresponding to the character-type identifier can be extracted, and the first characteristic information and the second characteristic information are recombined to generate the first identifier. In the above implementation process, the image types are classified, and the corresponding identifier is set for each image type, which can ensure that images of different types correspond to different identifiers.

The above is a process of information reorganization according to identifiers of different image types. The characteristic information of the corresponding identifier is extracted for each image type, and then recombination is performed according to the extracted characteristic information to generate the first identifier. Therefore, it is convenient for users to recognize different types of images according to the generated first identifier and quickly find images of different types. At the same time, because characteristics of the identifiers of different image types are recombined, the number of identifiers can be reduced, and the simplicity of the preset control can be ensured.

In the embodiments of the present disclosure, the determining a second display position of the first identifier based on the N images includes: obtaining a display height of each image of the N images on the image display interface; calculating an average height according to the display height of each image on the image display interface; calculating a height ratio of the average height to an interface height of the image display interface; calculating a first product value of the height ratio and a height of the preset control; and determining the second display position according to the first product value.

When determining the second display position of the first identifier in the preset control, the display height of each image of the N images on the image display interface needs to be obtained, and then based on the display height of each image on the image display interface, the interface height of the image display interface, and the height of the preset control, the second display position is determined. The interface height of the image display interface refers to the height of the complete image display interface, and includes the height displayed within the screen and the height displayed outside the screen. That is, if the image display interface includes 10 lines, but the screen can only display 3 lines, the interface height of the image display interface refers to the sum of the height of 10 lines of images, the height of the interval between adjacent lines of images, and the height corresponding to the upper and lower edges. The display height of each image on the image display interface is also based on the complete image display interface.

The process of determining the second display position based on the display height of each image on the image display interface, the interface height of the image display interface, and the height of the preset control is: according to the display height of each image on the image display interface, the average height of the N images is calculated, and then the height ratio of the obtained average height to the interface height of the image display interface is calculated. After obtaining the height ratio, the product of the height ratio and the height of the preset control is calculated, to obtain the first product value. The second display position is determined in the preset control according to the first product value.

That is, the above calculation process can be expressed by the following formula: the second display position divided by the height of the preset control is equal to the average height of the N images divided by the interface height of the image display interface.

The above is the process of determining the display position of the first identifier according to the display height of the image. According to the relationship between the average height of the N images and the interface height of the image display interface, the second display position is determined in the preset control. This can ensure that the user can view the corresponding image based on the position information of the identifier in the preset control, and improve the user's image search efficiency.

It should be noted that when determining the second display position, if the N images are in the same row, the display height of any image on the image display interface is the average height; if the N images are in different rows, the display height corresponding to each row needs to be obtained, and then the average height is calculated. If the average height of the N images selected for the first time is the same as the average height of the N images selected for the second time when the user selects the N images, the first identifiers corresponding to two times of selection can be displayed side by side at the same height of the preset control. At this time, the width of the preset control needs to accommodate two first identifiers, and the two first identifiers are arranged sequentially along the width direction of the preset control. The first identifier generated for the first time is displayed in the front, and the first identifier generated for the second time is displayed in the back. By analogy, if the average heights of the N images selected for multiple times are the same, the width of the preset control can be adjusted, to ensure that the first identifiers are arranged sequentially in the width direction at the same height of the preset control.

In the embodiments of the present disclosure, before the receiving a first input that is performed by a user on a first identifier in a preset control displayed at a target position of an image display interface, the method further includes: receiving a third input that is performed on a second identifier in a preset control displayed at a target position of an image display interface by a user; and in response to the third input, recording a third display position of the second identifier in the preset control; where an input interval between the third input and the first input is the shortest.

Before the first input that is performed by the user on the first identifier is received, the third input that is performed by the user on the second identifier in the preset control can be received. The third input is located before the first input and an input interval between the third input and the first input is the shortest. The third input can be regarded as a previous input of the first input, where the previous input refers to a previous input for the preset control. After receiving the third input that is performed by the user on the second identifier, the third display position corresponding to the second identifier in the preset control can be recorded according to the third input.

The above is the process of recording the display position of the second identifier. By recording the third display position of the second identifier in the preset control, a function of quickly returning to a previous browsing position can be provided, so that the user can conveniently continue to perform an operation.

After the recording a third display position of the second identifier in the preset control, the method further includes: marking the second identifier displayed at the third display position as a preset state, where the preset state indicates that the second identifier is an identifier operated by the user before the first input is received.

After recording the third display position, the second identifier corresponding to the third display position can be marked, and the second identifier is marked to indicate that the second identifier is the identifier operated by the user before the first input is received. The second identifier is marked, so that it can be convenient for users to distinguish in a subsequent process. When the user sees the second identifier in the preset state, the user no longer operates the second identifier, and the second identifier is used as a starting point to continue browsing other identifiers, to switch the view to the previously browsed position to continue browsing selection.

Figure 4:
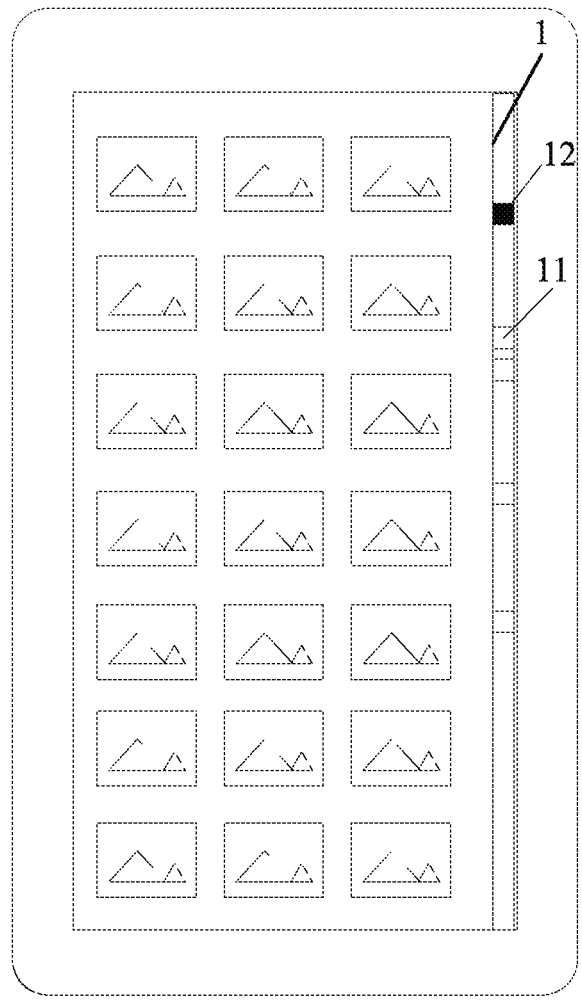
FIG. 4 is a schematic diagram of displaying a second identifier in a preset control according to an embodiment of the present disclosure.

For example, as shown in FIG. 4, before the operation performed by the user on the first identifier 11 is received, the third input that is performed by the user on the second identifier 12 in the preset control 1 can be received, the third display position of the second identifier 12 is recorded, and the second identifier 12 is marked as the preset state (black as shown in the figure). When the user sees the second identifier 12 in the preset state, the user can use the second identifier 12 as the starting point and continue to browse other identifiers.

The above is the process of marking the second identifier. By marking the identifier operated by the user, the user's browsing efficiency can be improved, and the problem of repeatedly browsing the selected image can be avoided.

In the embodiments of the present disclosure, after the displaying at least one thumbnail associated with the first identifier; the method further includes:
  receiving a first slide input that is performed by a user, where an input start position of the first slide input is located at the first identifier, and an input end position of the first slide input is located at the image display interface; and in response to the first slide input, updating the at least one thumbnail from a current first display state to a second display state, and displaying the at least one thumbnail in the second display state at a fourth display position of the image display interface; where a size of each thumbnail in the second display state is larger than a size of each thumbnail in the first display state, and in the second display state, a selected area is displayed on a preset side of each thumbnail, and the selected area is used for selecting each thumbnail and/or an image corresponding to each thumbnail.

After the at least one thumbnail associated with the first identifier is displayed on the image display interface, if the user continues to slide on the preset control, display of at least one thumbnail associated with the first identifier is canceled. If the first sliding input that is performed by the user from the first identifier towards the image display interface is received after the at least one thumbnail associated with the first identifier is displayed, a thumbnail update mode can be entered. According to the user's first sliding input, at least one thumbnail is controlled to update from the current first display state to the second display state, where a size of a thumbnail in the second display state is larger than a size of a thumbnail in the first display state, and in the second display state, a selected area used for selecting each thumbnail and/or an image corresponding to each thumbnail is displayed on a preset side of a thumbnail.

Figure 5A:
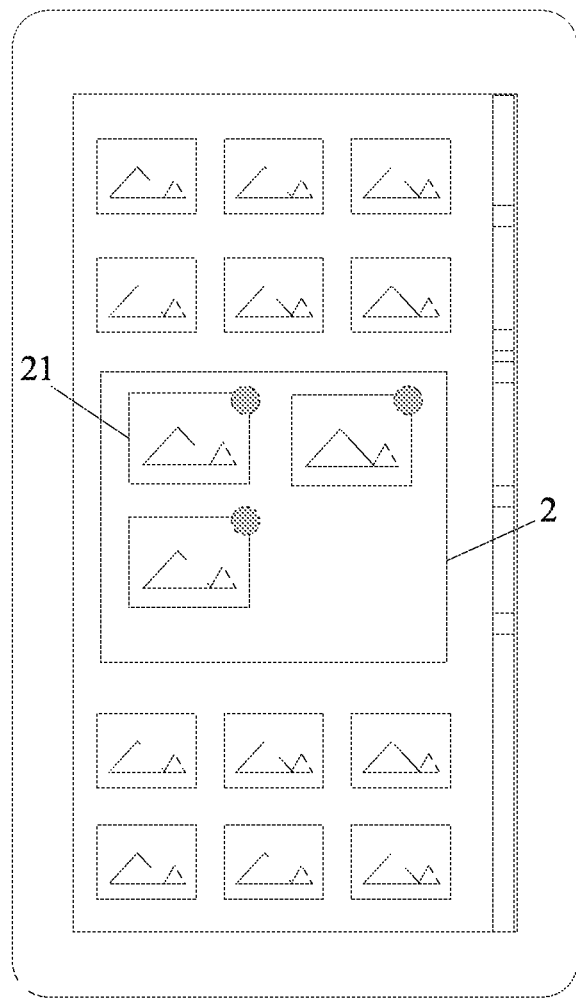
FIG. 5A is a first schematic diagram of displaying a thumbnail in a second display state according to an embodiment of the present disclosure.

After the display state is updated, at least one thumbnail in the second display state can be displayed in the fourth display position of the image display interface. As shown in FIG. 5A, at least one thumbnail 21 in the second display state can be displayed in the floating window 2, and the selected area of the thumbnail 21 is in the selected state at this time. The floating window 2 shown in FIG. 5A is not displayed with preset transparency, and the image on the image display interface is covered. A person skilled in the art can set that the floating window and the thumbnail in the second display state are displayed with the preset transparency, and the thumbnail does not disappear when the finger of the user leaves the display screen.

The above is the process of updating the thumbnail state. The thumbnail update mode is entered through the user's first sliding input, so that at least one thumbnail is updated from the current first display state to the second display state, and the selected area is displayed on the preset side of the thumbnail. Therefore, the user can operate the thumbnail and/or the image corresponding to the thumbnail in the selected area, so that the user can conveniently select one or more images.

In the embodiments of the present disclosure, after the updating the at least one thumbnail from a current first display state to a second display state, and displaying the at least one thumbnail in the second display state at a fourth display position of the image display interface, the method further includes:
  receiving a fourth input that is performed by the user on a selected area of a second thumbnail of the at least one thumbnail; in response to the fourth input, updating the selected area of the second thumbnail to a non-selected state; and in a case that a selected area of the entirety of the at least one thumbnail is in the non-selected state, canceling display of the first identifier.

Figure 5B:
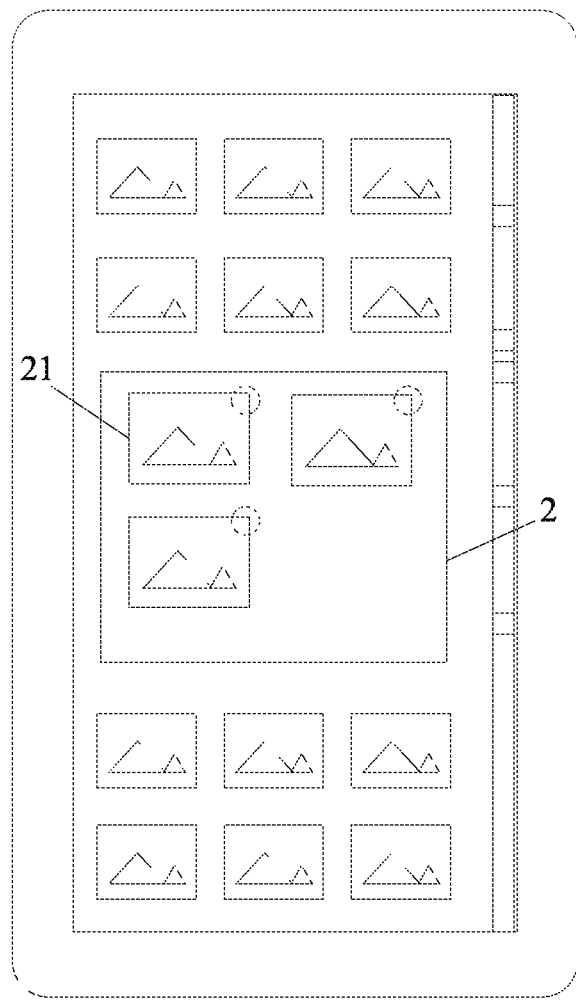
FIG. 5B is a second schematic diagram of displaying a thumbnail in a second display state according to an embodiment of the present disclosure.

After at least one thumbnail in the second display state is displayed, the selected area of at least one thumbnail in the second display state is in the selected state. If a fourth input that is performed by the user on a selected area of a second thumbnail of the at least one thumbnail is received, the selected area of the second thumbnail is controlled to update to a non-selected state. As shown in FIG. 5B, the selected area of the thumbnail 21 in the floating window 2 is entirely updated to the non-selected state. That is, the user can click the selected area to cancel the selected state. If the user still wants to select the thumbnail and/or the image corresponding to the thumbnail, the user can click the selected area again to make the selected area in the selected state.

It should be noted that after the fourth input that is performed by the user on the selected area of the second thumbnail is received and the selected area of the second thumbnail is controlled to update to a non-selected state according to the fourth input, it needs to be detected whether a selected area of the entirety of the at least one thumbnail is in the non-selected state, and if yes, display of the first identifier can be canceled to update the preset control.

In the above process, by entering the thumbnail update mode, at least one thumbnail is controlled to update from the current first display state to the second display state, which can facilitate the user to operate the selected area. A canceling operation is performed on the selected thumbnail and/or image corresponding to the thumbnail, and the selected state is restored when it is necessary, so that the user can choose an operation according to a requirement. When selected areas of all thumbnails are in the non-selected state, display of the first identifier is canceled, the preset control can be updated in real time.

It should be noted that after controlling at least one thumbnail to update from the current first display state to the second display state, according to the user's operation on one of the thumbnails, an image corresponding to the thumbnail is controlled to display in a manner different from those of other images.

In the embodiments of the present disclosure, after the updating the at least one thumbnail from a current first display state to a second display state, and displaying the at least one thumbnail in the second display state at a fourth display position of the image display interface, the method further includes:
  when receiving a fifth input that is performed at a preset position on the image display interface by a user, or receiving a second slide input that is performed by the user in the preset control, controlling the entirety of the at least one thumbnail to restore to the first display state.

After displaying at least one thumbnail in the second display state at the fourth display position of the image display interface, if receiving the fifth input that is performed by the user at a preset position on the image display interface, or receiving a second slide input that is performed by the user in the preset control, the thumbnail update mode can be exited, and the thumbnail in the second display state is controlled to return to the first display state. The preset position can be a blank position of the image display interface, or can be a position outside a specific area including the at least one thumbnail in the second display state, or can be other positions, which are not limited herein.

In the above process, after at least one thumbnail in the second display state is displayed at the fourth display position, the thumbnail update mode is exited according to the user's operation, so that the mode can be switched according to the user's selection, making the user's operation more convenient.

In the embodiments of the present disclosure, a setting interface may be provided, allowing the user to add, delete, and modify a default identifier of the system on the setting interface. In an adding solution, based on a default identifier in the related technology a user-defined identifier can be added. In a deletion solution, some of default multiple identifiers in the related technology can be deleted, and only some default identifiers are reserved, which is convenient for users to remember. In a modification solution, a default identifier is modified to an identifier that the user is accustomed to use. An identifier that is set on the setting interface can be a default identifier of the system, or a user-defined identifier, or can include both. By using a user-defined identifier, user's image search efficiency can be improved.

In the embodiments of the present disclosure, before the receiving a first input that is performed by a user on a first identifier in a preset control displayed at a target position of an image display interface, the method further includes:

receiving a sixth input that is performed by a user on a third identifier on a setting interface of the preset control; and in response to the sixth input, hiding the third identifier; where the third identifier is an identifier operated by the user and/or an identifier selected by the user.

Figure 6:
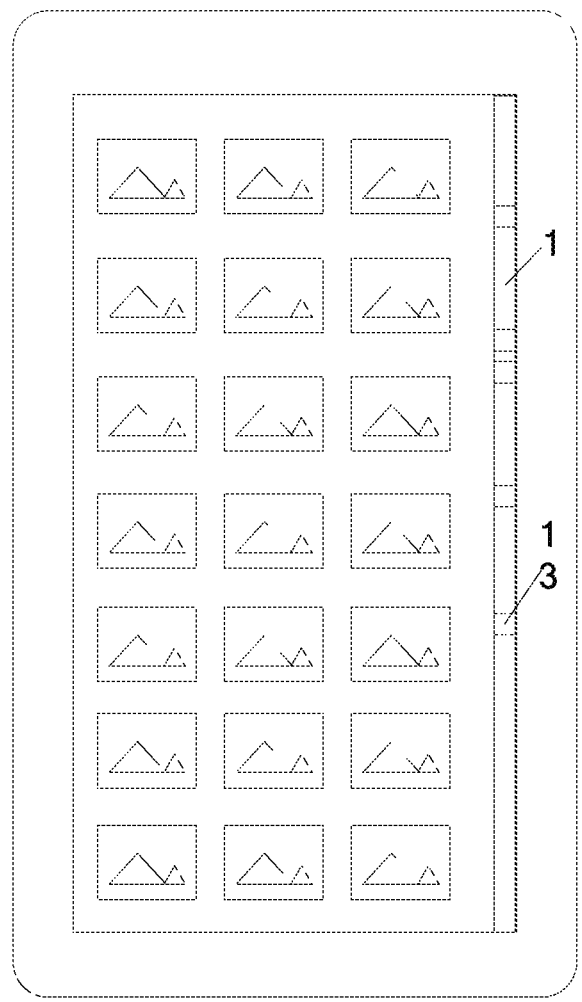
FIG. 6 is a schematic diagram of hiding display of a third identifier in a preset control according to an embodiment of the present disclosure.

After hiding the third identifier, only an identifier that is not operated by the user and/or is not selected by the user is displayed in the preset control. A trigger effect of the user's operation in the preset control is only for the displayed identifier and the corresponding image. The third identifier is not displayed or displayed with a weakened effect, as shown in FIG. 6, and the third identifier 13 is displayed with a dotted line effect in the preset control 1. Correspondingly, the image corresponding to the third identifier 13 may not be displayed or displayed with a weakened effect, that is, the image corresponding to the third identifier 13 cannot be displayed, or even if the image corresponding to the third identifier 13 can be displayed, jumping to the image is not supported.

By hiding the third identifier operated by the user and/or selected by the user, it can be ensured that the user is not interfered by the third identifier, and this ensures the simplicity of the preset control, improves the user's browsing efficiency, and avoids the problem of repeated browsing of the selected image.

In technical solutions of the present disclosure, a first input that is performed by a user on a first identifier in a preset control displayed at a target position of an image display interface is received; in response to the first input, at least one thumbnail associated with the first identifier is displayed; a second input that is performed on a first thumbnail of the at least one thumbnail is received; and in response to the second input, a first display position of a first image corresponding to the first thumbnail is marked on the image display interface. The preset control and the identifier are disposed, so that a distribution position of a selected image can be displayed, and a user quickly slides to find the selected image. At the same time, the image can be displayed according to an operation performed by the user on the identifier, to quickly view the image. The thumbnail is hidden when the thumbnail is not needed. Therefore, this does not occupy display space, and ensures reasonable use of space of the terminal device.

By recording the identifier operated by the user, this can provide a function of quickly returning to a browsing position. At the same time, this can allow the user to continue to operate other identifiers starting from the identifier, to avoid repeated operations on the same identifier. Update of the thumbnail display state is controlled, the mode can be switched according to the user's selection, and the preset control can be updated in real time.

By hiding the specific identifier and generating the identifier according to the image type, the simplicity of the preset control can be ensured, the browsing efficiency of the user can be improved, and the search efficiency can be improved.

Figure 7:
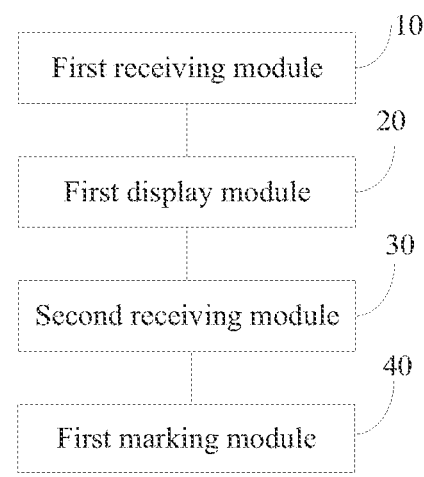
FIG. 7 is a schematic diagram of a terminal device according to an embodiment of the present disclosure.

An embodiment of the present disclosure provides a terminal device. As shown in FIG. 7, the terminal device includes:

a first receiving module 10, configured to receive a first input that is performed by a user on a first identifier in a preset control displayed at a target position of an image display interface, where the image display interface includes at least one image;

a first display module 20, configured to display at least one thumbnail associated with the first identifier in response to the first input;

a second receiving module 30, configured to receive a second input that is performed on a first thumbnail of the at least one thumbnail; and a first marking module 40, configured to mark a first display position of a first image corresponding to the first thumbnail on the image display interface in response to the second input.

The terminal device further includes:

a third receiving module, configured to before the first receiving module receives the first input that is performed by the user on the first identifier in the preset control displayed at the target position of the image display interface, receive a selection input that is performed by a user on N images on the image display interface, where the N images fall within a same display range;

a generation module, configured to generate, in response to the selection input, the first identifier associated with the N images;

a determining module, configured to determine a second display position of the first identifier based on the N images; and a second display module, configured to display the first identifier at the second display position of the preset control;

where N is a positive integer.

The generation module includes:

a first obtaining submodule, configured to obtain an image type of each image of the N images; and a generation submodule, configured to generate, according to the image type of each image of the N images, the first identifier associated with the N images.

The determining module includes:

a second obtaining submodule, configured to obtain a display height of each image of the N images on the image display interface;

a first calculation submodule, configured to calculate an average height according to the display height of each image on the image display interface;

a second calculation submodule, configured to calculate a height ratio of the average height to an interface height of the image display interface;

a third calculation submodule, configured to calculate a first product value of the height ratio and a height of the preset control; and a determining submodule, configured to determine the second display position according to the first product value.

The generation submodule includes:

a first generation unit, configured to generate, according to the image type of each image of the N images, an identifier corresponding to each image type; and a second generation unit, configured to obtain characteristic information of each identifier, and re-organize the characteristic information to generate the first identifier.

The terminal device further includes:

a fourth receiving module, configured to before the first receiving module receives the first input that is performed by the user on the first identifier in the preset control displayed at the target position of the image display interface, receive a third input that is performed by a user on a second identifier in the preset control displayed at the target position of the image display interface; and a recording module, configured to record a third display position of the second identifier in the preset control in response to the third input; where an input interval between the third input and the first input is the shortest.

The terminal device further includes:

a second marking module, configured to after the recording module records a third display position of the second identifier in the preset control, mark the second identifier displayed at the third display position as a preset state, where the preset state indicates that the second identifier is an identifier operated by the user before the first input is received.

The terminal device further includes:

a fifth receiving module, configured to after the first display module displays at least one thumbnail associated with the first identifier, receive a first slide input that is performed by a user, where an input start position of the first slide input is located at the first identifier, and an input end position of the first slide input is located at the image display interface; and a first update module, configured to update the at least one thumbnail from a current first display state to a second display state, and display the at least one thumbnail in the second display state at a fourth display position of the image display interface in response to the first slide input;

where a size of each thumbnail in the second display state is larger than a size of each thumbnail in the first display state, and in the second display state, a selected area is displayed on a preset side of each thumbnail, and the selected area is used for selecting each thumbnail and/or an image corresponding to each thumbnail.

The terminal device further includes:

a sixth receiving module, configured to after the first update module updates the at least one thumbnail from a current first display state to a second display state, and displays the at least one thumbnail in the second display state at a fourth display position of the image display interface, receive a fourth input that is performed by a user on a selected area of a second thumbnail of the at least one thumbnail;

a second update module, configured to update the selected area of the second thumbnail to a non-selected state in response to the fourth input; and a canceling module, configured to in a case that a selected area of the entirety of the at least one thumbnail is in the non-selected state, cancel display of the first identifier.

The terminal device further includes:

a control module, configured to after the first update module updates the at least one thumbnail from a current first display state to a second display state, and displays the at least one thumbnail in the second display state at a fourth display position of the image display interface, when receiving a fifth input that is performed by a user at a preset position on the image display interface, or receiving a second slide input that is performed by a user in the preset control, control the entirety of the at least one thumbnail to restore to the first display state.

The terminal device further includes:

a seventh receiving module, configured to before the first receiving module receives the first input that is performed by the user on the first identifier in the preset control displayed at the target position of the image display interface, receive a sixth input that is performed by a user on a third identifier on a setting interface of the preset control; and a hiding module, configured to hide the third identifier in response to the sixth input;

where the third identifier is an identifier operated by the user and/or an identifier selected by the user.

The terminal device provided in the embodiments of the present disclosure receives a first input that is performed by a user on a first identifier in a preset control displayed at a target position of an image display interface; in response to the first input, displays at least one thumbnail associated with the first identifier; receives a second input that is performed on a first thumbnail of the at least one thumbnail; and in response to the second input, marks a first display position of a first image corresponding to the first thumbnail on the image display interface. The preset control and the identifier are disposed, so that a distribution position of a selected image can be displayed, and a user quickly slides to find the selected image. At the same time, the image can be displayed according to an operation performed by the user on the identifier, to quickly view the image. The thumbnail is hidden when the thumbnail is not needed. Therefore, this does not occupy display space, and ensures reasonable use of space of the terminal device.

By recording the identifier operated by the user, this can provide a function of quickly returning to a browsing position. At the same time, this can allow the user to continue to operate other identifiers starting from the identifier, to avoid repeated operations on the same identifier. Update of the thumbnail display state is controlled, the mode can be switched according to the user's selection, and the preset control can be updated in real time.

By hiding the specific identifier and generating the identifier according to the image type, the simplicity of the preset control can be ensured, the browsing efficiency of the user can be improved, and the search efficiency can be improved.

Figure 8:
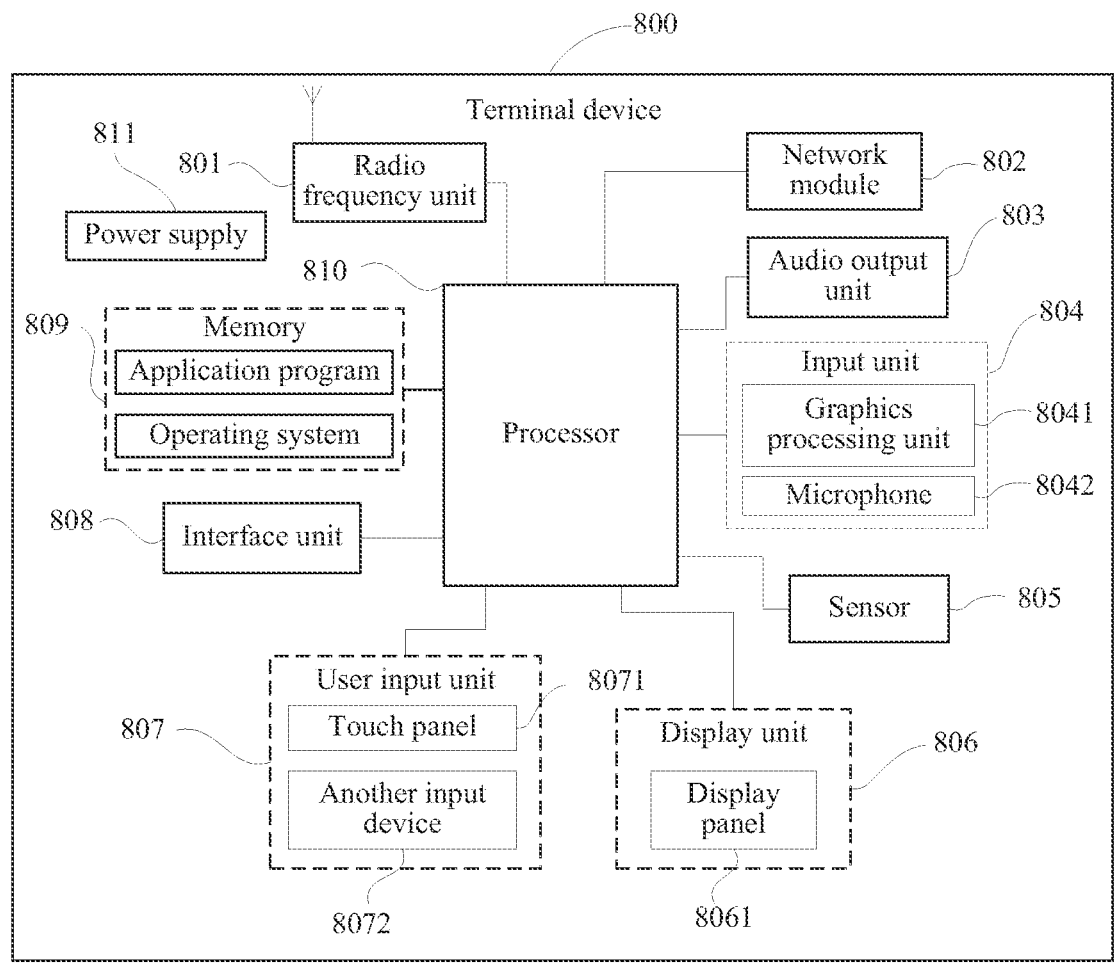
FIG. 8 is a schematic diagram of a hardware structure of a terminal device according to an embodiment of the present disclosure.

FIG. 8 is a schematic diagram of a hardware structure of a terminal device implementing the various embodiments of the present disclosure. The terminal device 800 includes, but not limited to: a radio frequency unit 801, a network module 802, an audio output unit 803, an input unit 804, a sensor 805, a display unit 806, a user input unit 807, an interface unit 808, a memory 809, a processor 810, a power supply 811, and the like, A person skilled in the art may understand that the structure of the terminal device shown in FIG. 8 does not constitute a limitation to the terminal device. The terminal device may include more or fewer components than that shown in the figure, or a combination of some components, or an arrangement of different components. In this embodiment of the present disclosure, the terminal device includes but is not limited to a mobile phone, a tablet computer, a notebook computer, a palmtop computer, a vehicle-mounted terminal, a wearable device, a pedometer, or the like.

The user input unit 807 is configured to receive a first input that is performed by a user on a first identifier in a preset control displayed at a target position of an image display interface, where the image display interface includes at least one image. The processor 810 is configured to control the display unit 806 to display at least one thumbnail associated with the first identifier in response to the first input. The user input unit 807 is further configured to receive a second input that is performed on a first thumbnail of the at least one thumbnail. The processor 810 is further configured to mark a first display position of a first image corresponding to the first thumbnail on the image display interface in response to the second input.

Before receiving the first input that is performed by the user on the first identifier in the preset control displayed at the target position of the image display interface, the user input unit 807 is further configured to receive a selection input that is performed by a user on N images on the image display interface, where the N images fall within a same display range. The processor 810 is configured to generate, in response to the selection input, the first identifier associated with the N images; determine a second display position of the first identifier based on the N images; and control the display unit 806 to display the first identifier at the second display position of the preset control; where N is a positive integer.

When generating, in response to the selection input, the first identifier associated with the N images, the processor 810 is further configured to obtain an image type of each image of the N images; and generate, according to the image type of each image of the N images, the first identifier associated with the N images.

When determining a second display position of the first identifier based on the N images, the processor 810 is further configured to obtain a display height of each image of the N images on the image display interface; calculate an average height according to the display height of each image on the image display interface; calculate a height ratio of the average height to an interface height of the image display interface; calculate a first product value of the height ratio and a height of the preset control; and determine the second display position according to the first product value.

When generating, according to the image type of each image of the N images, the first identifier associated with the N images, the processor 810 is further configured to generate, according to the image type of each image of the N images, an identifier corresponding to each image type; and obtain characteristic information of each identifier, and re-organize the characteristic information to generate the first identifier.

Before receiving the first input that is performed by the user on the first identifier in the preset control displayed at the target position of the image display interface, the user input unit 807 is further configured to receive a third input that is performed by a user on a second identifier in the preset control displayed at the target position of the image display interface. The processor 810 is further configured to record a third display position of the second identifier in the preset control in response to the third input; where an input interval between the third input and the first input is the shortest.

After recording a third display position of the second identifier in the preset control, the processor 810 is further configured to mark the second identifier displayed at the third display position as a preset state, where the preset state indicates that the second identifier is an identifier operated by the user before the first input is received.

After displaying at least one thumbnail associated with the first identifier, the user input unit 807 is further configured to receive a first slide input that is performed by a user, where an input start position of the first slide input is located at the first identifier, and an input end position of the first slide input is located at the image display interface; and the processor 810 is further configured to update the at least one thumbnail from a current first display state to a second display state, and control the display unit 806 to display the at least one thumbnail in the second display state at a fourth display position of the image display interface in response to the first slide input;

where a size of each thumbnail in the second display state is larger than a size of each thumbnail in the first display state, and in the second display state, a selected area is displayed on a preset side of each thumbnail, and the selected area is used for selecting each thumbnail and/or an image corresponding to each thumbnail.

After the processor 810 updates the at least one thumbnail from a current first display state to a second display state, and controls the display unit 806 to display the at least one thumbnail in the second display state at a fourth display position of the image display interface, the user input unit 807 is further configured to receive a fourth input that is performed by a user on a selected area of a second thumbnail of the at least one thumbnail. The processor 810 is further configured to update the selected area of the second thumbnail to a non-selected state in response to the fourth input; and in a case that a selected area of the entirety of the at least one thumbnail is in the non-selected state, cancel display of the first identifier.

After the processor 810 updates the at least one thumbnail from a current first display state to a second display state, and controls the display unit 806 to display the at least one thumbnail in the second display state at a fourth display position of the image display interface, when the user input unit 807 receives a fifth input that is performed by a user at a preset position on the image display interface, or receives a second slide input that is performed by a user in the preset control, the processor 810 is further configured to control the entirety of the at least one thumbnail to restore to the first display state.

Before receiving the first input that is performed by the user on the first identifier in the preset control displayed at the target position of the image display interface, the user input unit 807 is further configured to receive a sixth input that is performed by a user on a third identifier on a setting interface of the preset control; and the processor 810 is further configured to hide the third identifier in response to the sixth input; where the third identifier is an identifier operated by the user and/or an identifier selected by the user.

In this way, a first input that is performed by a user on a first identifier in a preset control displayed at a target position of an image display interface is received; in response to the first input, at least one thumbnail associated with the first identifier is displayed; a second input that is performed on a first thumbnail of the at least one thumbnail is received; and in response to the second input, a first display position of a first image corresponding to the first thumbnail is marked on the image display interface. The preset control and the identifier are disposed, so that a distribution position of a selected image can be displayed, and a user quickly slides to find the selected image. At the same time, the image can be displayed according to an operation performed by the user on the identifier, to quickly view the image. The thumbnail is hidden when the thumbnail is not needed. Therefore, this does not occupy display space, and ensures reasonable use of space of the terminal device.

By recording the identifier operated by the user, this can provide a function of quickly returning to a browsing position. At the same time, this can allow the user to continue to operate other identifiers starting from the identifier, to avoid repeated operations on the same identifier. Update of the thumbnail display state is controlled, the mode can be switched according to the user's selection, and the preset control can be updated in real time.

By hiding the specific identifier and generating the identifier according to the image type, the simplicity of the preset control can be ensured, the browsing efficiency of the user can be improved, and the search efficiency can be improved.

It should be understood that in the embodiments of the present disclosure, the radio frequency unit 801 can be configured to receive and send information or receive and send signal during calls. For example, the radio frequency unit receives downlink data from a base station, and transmits the downlink data to the processor 810 for processing. In addition, the radio frequency unit sends uplink data to the base station. Generally, the radio frequency unit 801 includes, but is not limited to, an antenna, at least one amplifier, a transceiver, a coupler, a low noise amplifier, a duplexer, and the like. In addition, the radio frequency unit 801 may further communicate with other devices through a wireless communications system and network.

The terminal device provides a user with wireless broadband Internet access through the network module 802, for example, helps the user send and receive emails, browse web pages, and access streaming media.

The audio output unit 803 can convert audio data received by the radio frequency unit 801 or the network module 802 or stored in the memory 809 into an audio signal, and output the audio signal as sound. In addition, the audio output unit 803 may further provide audio output (for example, call signal receiving sound or message receiving sound) related to a specific function performed by the terminal device 800. The audio output unit 803 includes a speaker, a buzzer, a telephone receiver, and the like.

The input unit 804 is configured to receive audio or video signals. The input unit 804 may include a graphics processing unit (CPU) 8041 and a microphone 8042. The graphics processing unit 8041 processes image data of a static image or a video obtained by an image capturing apparatus (for example, a camera) in a video capturing mode or an image capturing mode. A processed image frame may be displayed on the display unit 806. The image frame processed by the graphics processing unit 8041 may be stored in the memory 809 (or another storage medium) or sent by using the radio frequency unit 801 or the network module 802. The microphone 8042 may receive a sound and can process such sound into audio data. Processed audio data may be converted, in telephone call mode, into a format that can be sent to a mobile communication base station via the radio frequency unit 801 for output.

The terminal device 800 further includes at least one sensor 805, such as a light sensor, a motion sensor, and other sensors. For example, the light sensor includes an ambient light sensor and a proximity sensor. The ambient light sensor may adjust luminance of the display panel 8061 based on brightness of ambient light. The proximity sensor may turn off the display panel 8061 and/or backlight when the terminal device 800 approaches an ear. As a motion sensor, an accelerometer sensor may detect magnitude of acceleration in various directions (usually three axes), may detect magnitude and the direction of gravity when stationary, may be configured to identify postures of the terminal device (such as horizontal and vertical screen switch, related games, and magnetometer posture calibration), may perform functions related to vibration identification (such as a pedometer and a knock), and the like. The sensor 805 may further include a fingerprint sensor, a pressure sensor, an iris sensor, a molecular sensor, a gyroscope, a barometer, a hygrometer, a thermometer, an infrared sensor, or the like. Details are not described herein.

The display unit 806 is configured to display information input by the user or information provided to the user. The display unit 806 may include a display panel 8061, and the display panel 8061 may be configured in a form of a liquid crystal display (LCD), an organic light-emitting diode (OLED), or the like.

The user input unit 807 may be configured to receive input numeral or character information, and generate key signal input related to user setting and function control of the terminal device. For example, the user input unit 807 includes a touch panel 8071 and another input device 8072. The touch panel 8071 is also referred to as a touchscreen, and may collect a touch operation performed by a user on or near the touch panel 8071 (such as an operation performed by a user on the touch panel 8071 or near the touch panel 8071 by using any proper object or accessory, such as a finger or a stylus). The touch panel 8071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 810, and receives and executes a command sent by the processor 810. In addition, the touch panel 8071 may be implemented in various types such as resistive, capacitive, infrared, and surface acoustic wave. In addition to the touch panel 8071, the user input unit 807 may also include another input device 8072. For example, the another input device 8072 may include but is not limited to a physical keyboard, a function key (such as a volume control key or a power on/off key), a trackball, a mouse, a joystick, and the like. Details are not described herein.

Optionally, the touch panel 8071 may cover the display panel 8061. When detecting a touch operation on or near the touch panel 8071, the touch panel 8071 transmits the touch operation to the processor 810 to determine a type of a touch event. Then the processor 810 provides corresponding visual output on the display panel 8061 based on the type of the touch event. Although in FIG. 8, the touch panel 8071 and the display panel 8061 are configured as two independent components to implement input and output functions of the terminal device, in some embodiments, the touch panel 8071 and the display panel 8061 can be integrated to implement the input and output functions of the terminal device. Details are not limited herein.

The interface unit 808 is an interface for connecting an external apparatus to the terminal device 800. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 808 may be configured to receive an input (for example, data information and power) from the external apparatus and transmit the received input to one or more elements in the terminal device 800, or transmit data between the terminal device 800 and the external apparatus.

The memory 809 may be configured to store a software program and various data. The memory 809 may mainly include a program storage area and a data storage area. The program storage area may store an operating system, an application program required by at least one function (such as a sound playback function and an image playback function), and the like. The data storage area may store data (such as audio data and an address book) created based on the use of the mobile phone, and the like. In addition, the memory 809 may include a high-speed random access memory, and may further include a non-volatile memory such as at least one magnetic disk storage component, a flash memory component, or another volatile solid-state storage component.

The processor 810 is a control center of the terminal device, connects various parts of the entire terminal device by using various interfaces and circuits, and performs various functions of the terminal device and processes data by running or executing the software programs and/or the modules stored in the memory 809 and invoking data stored in the memory 809, so as to monitor the terminal device as a whole. The processor 810 may include one or more processing units. Optionally, the processor 810 may integrate an application processor and a modem processor. The application processor mainly deals with an operating system, a user interface, an application program, and the like. The modem processor mainly deals with wireless communication. It can be understood that alternatively, the modem processor may not be integrated into the processor 810.

The terminal device 800 may further include the power supply 811 (such as a battery) supplying power to each component. Preferably, the power supply 811 may be logically connected to the processor 810 by using a power management system, so as to implement functions such as charging management, discharging management and power consumption management by using the power management system.

In addition, the terminal device 800 includes some function modules not shown Details are not described herein.

Optionally, an embodiment of the present disclosure further provides a terminal device, including a processor 810, a memory 809, and a computer program that is stored in the memory 809 and that can run on the processor 810. When the computer program is executed by the processor 810, each process of the embodiment of the foregoing image search method can be implemented, and a same technical effect can be achieved. To avoid repetition, details are not described herein again.

An embodiment of the present disclosure further provides a non-transitory computer-readable storage medium. The non-transitory computer-readable storage medium stores a computer program, and when the computer program is executed by a processor, the processes of the embodiment of the foregoing image search method are implemented, and a same technical effect can be achieved. To avoid repetition, details are not described herein again. The non-transitory computer-readable storage medium is, for example, a read-only memory (ROM), a random access memory (RAM), a magnetic disk, or an optical disc.

It should be noted that in this specification, the terms "comprise", "include", and any other variants thereof are intended to cover non-exclusive inclusion, so that a process, a method, an article, or an apparatus that includes a series of elements not only includes these very elements, but also includes other elements not expressly listed, or also includes elements inherent to this process, method, article, or apparatus. An element limited by "includes a . . . " does not, without more constraints, preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. An image search method, comprising:
   receiving a first input that is performed by a user on a first identifier in a preset control displayed at a target position of an image display interface, wherein the image display interface comprises at least two images;
   in response to the first input, displaying at least one thumbnail associated with the first identifier, wherein the first identifier is different from the at least one thumbnail and the at least two images;
   receiving a second input that is performed on a first thumbnail of the at least one thumbnail; and
   in response to the second input, marking a first display position of a first image corresponding to the first thumbnail on the image display interface, so that the first image is displayed in a form different from other images of the at least two images.

2. The method according to claim 1, wherein before the receiving a first input that is performed by a user on a first identifier in a preset control displayed at a target position of an image display interface, the method further comprises:
   receiving a selection input that is performed by a user on N images on the image display interface, wherein the N images fall within a same display range;
   generating, in response to the selection input, the first identifier associated with the N images;
   determining a second display position of the first identifier based on the N images; and
   displaying the first identifier at the second display position of the preset control;
   wherein N is a positive integer.

3. The method according to claim 2, wherein the generating, in response to the selection input, the first identifier associated with the N images comprises:
   obtaining an image type of each image of the N images; and
   generating, according to the image type of each image of the N images, the first identifier associated with the N images.

4. The method according to claim 2, wherein the determining a second display position of the first identifier based on the N images comprises:
   obtaining a display height of each image of the N images on the image display interface;
   calculating an average height according to the display height of each image on the image display interface;
   calculating a height ratio of the average height to an interface height of the image display interface;

calculating a first product value of the height ratio and a height of the preset control; and determining the second display position according to the first product value.

5. The method according to claim 3, wherein the generating, according to the image type of each image of the N images, the first identifier associated with the N images comprises:

generating, according to the image type of each image of the N images, corresponding to each image type; and obtaining characteristic information of each identifier, and re-organizing the characteristic information to generate the first identifier.

6. The method according to claim 1, wherein before the receiving a first input that is performed by a user on a first identifier in a preset control displayed at a target position of an image display interface, the method further comprises:

receiving a third input that is performed by a user on a second identifier in a preset control displayed at a target position of an image display interface; and in response to the third input, recording a third display position of the second identifier in the preset control; wherein an input interval between the third input and the first input is shortest.

7. The method according to claim 6, wherein after the recording a third display position of the second identifier in the preset control, the method further comprises:

marking the second identifier displayed at the third display position as a preset state, wherein the preset state indicates that the second identifier is operated by the user before the first input is received.

8. The method according to claim 1, wherein after the displaying at least one thumbnail associated with the first identifier, the method further comprises:

receiving a first slide input that is performed by a user, wherein an input start position of the first slide input is located at the first identifier, and an input end position of the first slide input is located at the image display interface; and in response to the first slide input, updating the at least one thumbnail from a current first display state to a second display state, and displaying the at least one thumbnail in the second display state at a fourth display position of the image display interface;

wherein a size of each thumbnail in the second display state is larger than a size of each thumbnail in the first display state, and in the second display state, a selected area is displayed on a preset side of each thumbnail, and the selected area is used for selecting each thumbnail and/or an image corresponding to each thumbnail.

9. The method according to claim 8, wherein after the updating the at least one thumbnail from a current first display state to a second display state, and displaying the at least one thumbnail in the second display state at a fourth display position of the image display interface, the method further comprises;

receiving a fourth input that is performed by a user on a selected area of a second thumbnail of the at least one thumbnail;

in response to the fourth input, updating the selected area of the second thumbnail to a non- selected state; and in a case that a selected area of the entirety of the at least one thumbnail is in the non- selected state, canceling display of the first identifier.

10. The method according to claim 8, wherein after the updating the at least one thumbnail from a current first display state to a second display state, and displaying the at least one thumbnail in the second display state at a fourth display position of the image display interface, the method further comprises;

when receiving a fifth input that is performed by a user at a preset position on the image display interface, or receiving a second slide input that is performed by a user in the preset control, controlling the entirety of the at least one thumbnail to restore to the first display state.

11. The method according to claim 1, wherein before the receiving a first input that is performed by a user on a first identifier in a preset control displayed at a target position of an image display interface, the method further comprises:

receiving a sixth input that is performed by a user on a third identifier on a setting interface of the preset control; and in response to the sixth input, hiding the third identifier; wherein the third identifier is operated by the user and/or selected by the user.

12. A terminal device, comprising a processor, a memory, and a computer program stored in the memory and executable on the processor, wherein the computer program, when executed by the processor, causes the terminal device to perform:

receiving a first input that is performed by a user on a first identifier in a preset control displayed at a target position of an image display interface, wherein the image display interface comprises at least two images;

in response to the first input, displaying at least one thumbnail associated with the first identifier, wherein the first identifier is different from the at least one thumbnail and the at least two images;

receiving a second input that is performed on a first thumbnail of the at least one thumbnail; and in response to the second input, marking a first display position of a first image corresponding to the first thumbnail on the image display interface, so that the first image is displayed in a form different from other images of the at least two images.

13. The terminal device according to claim 12, wherein the computer program, when executed by the processor, causes the terminal device to further perform:

receiving a selection input that is performed by a user on N images on the image display interface, wherein the N images fall within a same display range;

generating, in response to the selection input, the first identifier associated with the N images;

determining a second display position of the first identifier based on the N images; and displaying the first identifier at the second display position of the preset control;

wherein N is a positive integer.

14. The terminal device according to claim 13, wherein the computer program, when executed by the processor, causes the terminal device to perform:

obtaining an image type of each image of the N images; and generating, according to the image type of each image of the N images, the first identifier associated with the N images.

15. The terminal device according to claim 13, wherein the computer program, when executed by the processor, causes the terminal device to perform:

obtaining a display height of each image of the N images on the image display interface;

calculating an average height according to the display height of each image on the image display interface;

calculating a height ratio of the average height to an interface height of the image display interface;

calculating a first product value of the height ratio and a height of the preset control; and determining the second display position according to the first product value.

16. The terminal device according to claim 14, wherein the computer program, when executed by the processor, causes the terminal device to perform:

generating, according to the image type of each image of the N images, corresponding to each image type; and obtaining characteristic information of each identifier, and re-organizing the characteristic information to generate the first identifier.

17. The terminal device according to claim 12, wherein the computer program, when executed by the processor, causes the terminal device to further perform:

receiving a third input that is performed by a user on a second identifier in a preset control displayed at a target position of an image display interface; and in response to the third input, recording a third display position of the second identifier in the preset control; wherein an input interval between the third input and the first input is shortest.

18. The terminal device according to claim 12, wherein the computer program, when executed by the processor, causes the terminal device to further perform:

receiving a first slide input that is performed by a user, wherein an input start position of the first slide input is located at the first identifier, and an input end position of the first slide input is located at the image display interface; and in response to the first slide input, updating the at least one thumbnail from a current first display state to a second display state, and displaying the at least one thumbnail in the second display state at a fourth display position of the image display interface;

wherein a size of each thumbnail in the second display state is larger than a size of each thumbnail in the first display state, and in the second display state, a selected area is displayed on a preset side of each thumbnail, and the selected area is used for selecting each thumbnail and/or an image corresponding to each thumbnail.

19. The terminal device according to claim 12, wherein the computer program, when executed by the processor, causes the terminal device to further perform:

receiving a sixth input that is performed by a user on a third identifier on a setting interface of the preset control; and in response to the sixth input, hiding the third identifier; wherein the third identifier is operated by the user and/or selected by the user.

20. A non-transitory computer-readable storage medium, wherein the non-transitory computer-readable storage medium stores a computer program, and the computer program, when executed by a processor, causes the processor to perform:

receiving a first input that is performed by a user on a first identifier in a preset control displayed at a target position of an image display interface, wherein the image display interface comprises at least two images;

in response to the first input, displaying at least one thumbnail associated with the first identifier, wherein the first identifier is different from the at least one thumbnail and the at least two images;

receiving a second input that is performed on a first thumbnail of the at least one thumbnail; and in response to the second input, marking a first display position of a first image corresponding to the first thumbnail on the image display interface, so that the first image is displayed in a form different from other images of the at least two images.

* * * * *